May 23, 1961 P. S. MORGAN 2,985,059

PHONOGRAPH RECORD FOR PRAXINOSCOPIC DEVICES

Filed June 28, 1956 2 Sheets-Sheet 1

INVENTOR.
Porter S. Morgan
BY
Johnson and Kline
ATTORNEYS

May 23, 1961 P. S. MORGAN 2,985,059

PHONOGRAPH RECORD FOR PRAXINOSCOPIC DEVICES

Filed June 28, 1956 2 Sheets-Sheet 2

INVENTOR.
Porter S. Morgan
BY
Johnson and Kline
ATTORNEYS

United States Patent Office 2,985,059
Patented May 23, 1961

2,985,059

PHONOGRAPH RECORD FOR PRAXINOSCOPIC DEVICES

Porter S. Morgan, Westport, Conn., assignor to Morgan Development Laboratories, Inc., Westport, Conn., a corporation of Delaware Filed June 28, 1956, Ser. No. 594,567

2 Claims. (Cl. 88—16.2)

This invention relates to phonograph records having picture disks for praxinoscopic devices, and is an improvement on the inventions disclosed in my copending application Serial No. 579,235, filed April 19, 1956.

In said application there is disclosed a phonograph record disk having a circular succession of angularly spaced related pictures in progressively changing attitudes of movement and located in the area of the disk containing the sound grooves. The pictures are in mirror reverse with their bottoms directed toward the center of the disk and are to be reflected back to the viewer, as the phonograph turntable carrying the record rotates and the sound is being produced, by a pyramidal drum having mirror panels on its sides.

The record disk as shown in said application comprises a body or foundation of paper or cardboard carrying the praxinoscope pictures and provided with surface layers of plastic material. The sound grooves were formed by pressing them into the surface coatings and the board.

It has been found that it is quite difficult and expensive to obtain a satisfactory phonograph record in the manner stated because of the yielding nature of the paper or cardboard body. Besides, it involves extra expense to laminate the body and the surface layers of plastic material and to do this in a way so that the peripheral edges would be securely bonded.

These disadvantages have been overcome by the present invention by making the body of the disk of solid plastic moldable material and pressing the sound grooves in an annular band of predetermined width extending inwardly from adjacent the periphery of the disk and superposing on the face of the plastic disk a disk of paper or the like containing the praxinoscopic pictures. The diameter of the plastic disk is such as to provide an uncovered marginal sound groove band of sufficient width to receive the desired amount of sound grooves.

Thus, with the praxinoscope-phonograph record of the present invention, a clear area containing the sound grooves is obtained without reducing the optimum size of the picture disk or the pictures thereon for satisfactory direct viewing in the reflecting mirror used with the record. Besides, by eliminaing the sound grooves over the picture area, the pictures have greater clarity. Also, by having the sound groove area located outside the picture disk area, interference of the sound box and tonearm of acoustic phonographs with the centrally located reflecting mirror is avoided. The length of each sound groove convolution being substantially greater than if the sound grooves were in the picture area makes for greater ease of recording and fidelity of reproduction.

Other features and advantages will hereinafter appear.

In the accompanying drawings—

Figure 1:
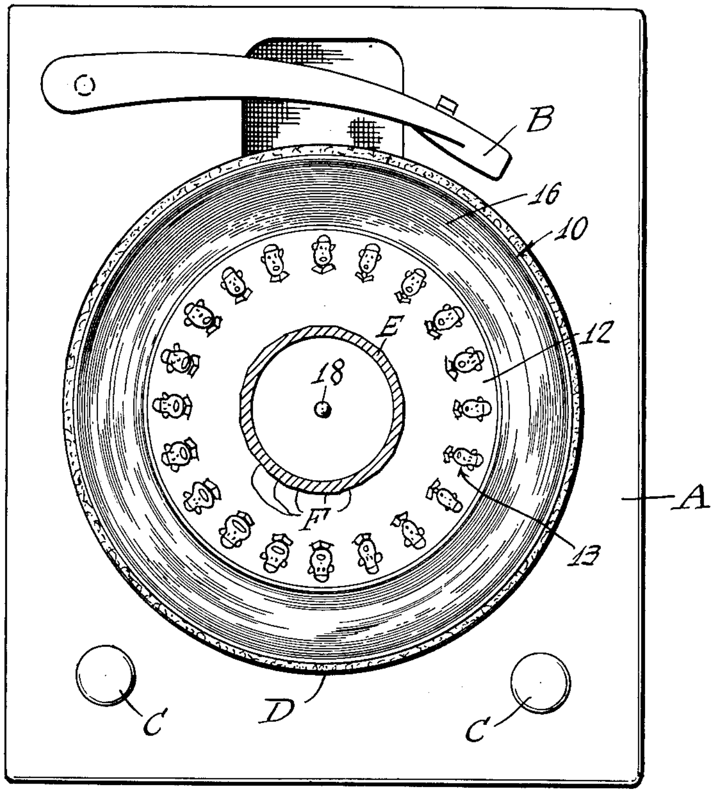
Figure 1 is a plan view of a praxinoscope-phonograph showing the record disk of the present invention mounted on the turntable thereof, the pictures being diagrammatically indicated and the mirror drum being shown in section.
Figure 2:
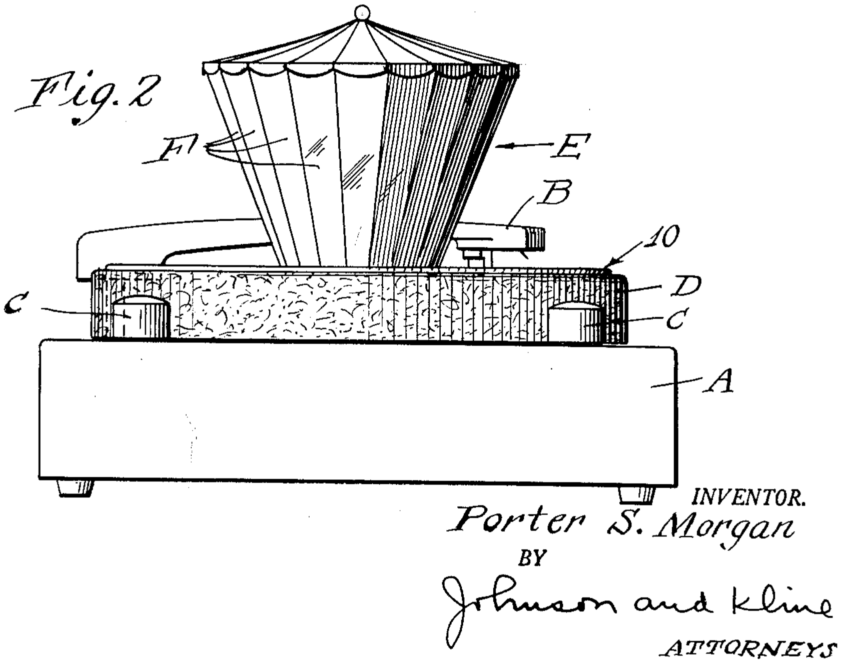
Fig. 2 is an elevation of the device shown in Fig. 1.

The disk-type phonograph shown in Figs. 1 and 2 may be of any suitable kind or construction. It has a casing A containing the usual parts such as the motor, amplifier, speaker, etc., a pickup arm B, controls C, and turntable D.

As disclosed in my copending application Serial No. 579,235, the phonograph disk or record comprises a picture disk having one or more circular successions of angularly spaced related pictures in progressively changing attitudes of movement so that as the disk rotates a pyramidal mirror drum E placed on top of the record, as shown in Fig. 2, will reflect the pictures back to the eyes of a viewer. The drum has an annular succession of mirror panels F, and thus as the drum rotates the images observed in the panels give the appearance of movement—there being a sufficient number of pictures and panels, considering the speed at which the picture disk is rotated, to present to the viewer continuous smoothly moving images. The record disk disclosed in my said copending application was so arranged that the sound grooves were impressed directly over the picture area of the disk and had the disadvantages above referred to.

Figures 3, 4, 5, 7, 8:
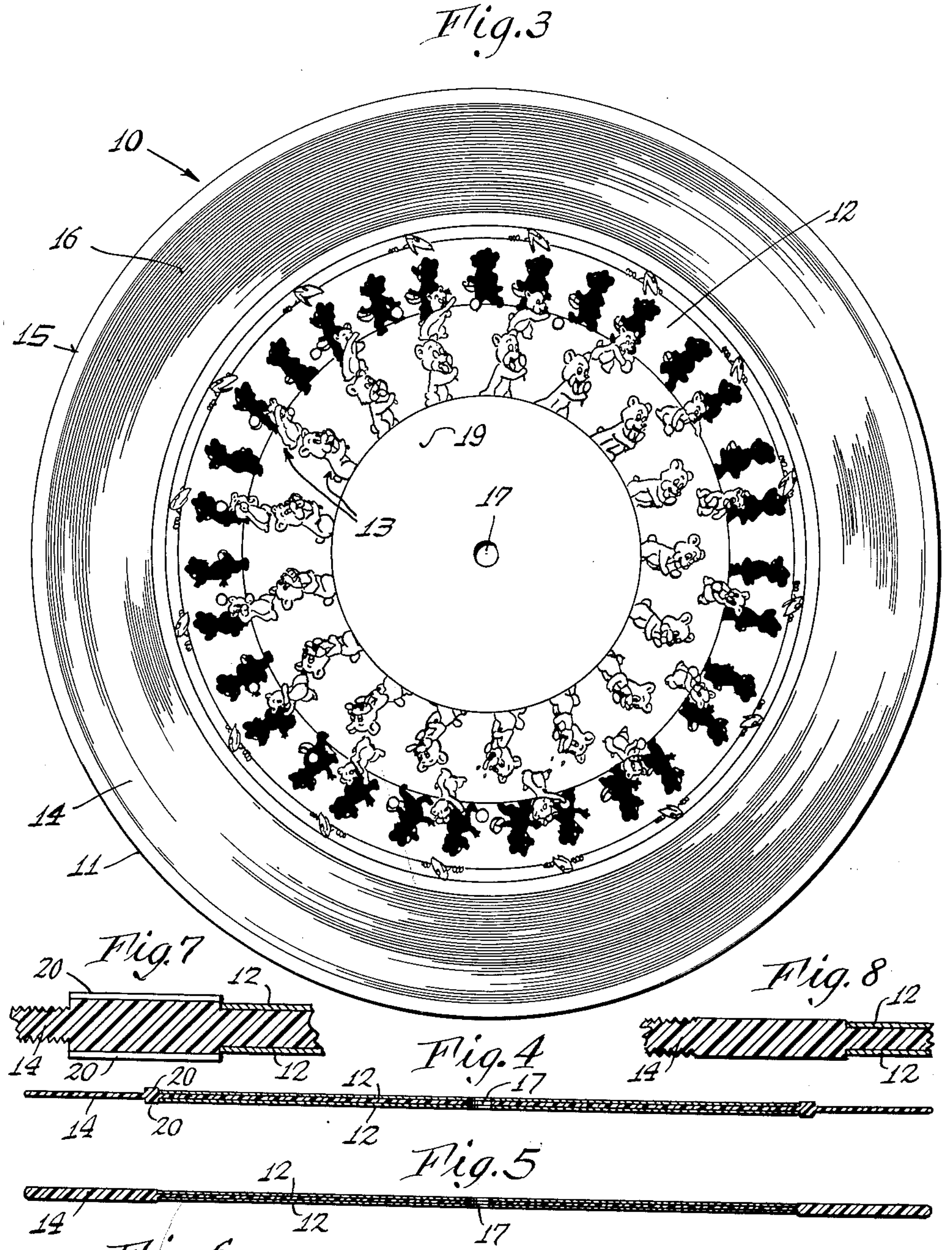
Fig. 3 is a plan view of a record disk made in accordance with the present invention.
Fig. 4 is a diagrammatic cross-section of one form of record disk made in accordance with this invention.
Fig. 5 is a view similar to Fig. 4 of another form of record disk.
Fig. 7 is a fragmentary view of a portion of the record shown in Fig. 4 showing more accurately the relative thicknesses of the plastic body and picture disk.
Fig. 8 is a view similar to Fig. 7 of the record shown in Fig. 5.

Referring to the improved praxinoscope-phonograph record disk 10 of the present invention shown in Fig. 3, the body 11 comprises a disk of solid plastic moldable material such as Vinylite, cellulose acetate or other suitable material, and on this disk there is superposed a disk 12 of paper or the like carrying picture images 13. The diameter of the body 11 is such as to provide outside of the area covered by the picture disk 12 an uncovered area forming an annular marginal band 14 located between the picture disk 12 and the peripheral edge 15 in which the sound grooves 16 are impressed. In the case of a double-face record, as shown in Figs. 4 and 5, there is a picture disk 12 located on each face of the disk and the sound grooves 16 are impressed on each side of the annular band 14. The record 10 has the usual central hole 17 to receive the turntable post 18.

The picture area of the picture disk is also annular and extends inwardly from the sound groove band 14 to the center portion 19 of the record which usually carries the label for the record.

Figure 6:
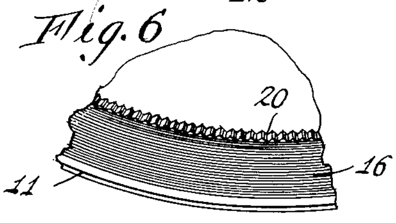
Fig. 6 is a perspective view of a fragment of the record disk shown in Fig. 4.

The picture disks 12 may be located on the surface of the disk 10, as shown in Figs. 4 and 7, so as to be elevated slightly above the level of the sound groove band 14, or they may be placed in recesses, as shown in Figs. 5 and 8, to be slightly below the surface of the sound groove band 14. If the picture disks are located as shown in Fig. 4, an annular ridge 20 may be provided on each side of the record, and this may be serrated, as shown in Fig. 6, so as to prevent the slippage between the record and the turntable which might otherwise occur because of the contact of the picture disk 12 with the surface of the turntable. This is particularly advantageous when the picture disk has a smooth finish produced either in the printing of the disk or by a supplemental coating.

As indicated in Figs. 1 and 2, in the use of the record of my invention, the record is placed on the turntable of a phonograph and then the mirror drum E is placed on the record so as to occupy the central portion 19 which usually carries the label for the record. The tone-arm B of the phonograph is then placed on the outer edge of the record so that the needle will engage the outer sound grooves in the band 14.

A child or other user of the phonograph positions his head relative to the phonograph, and particularly the mirror drum E, so that as the phonograph is played the animated and other pictures on the record will appear as images on the mirror drum. It is necessary, therefore, that the pictures on the picture disk be of such size as to be clearly visible to the observer.

To be useful without substantial magnification, the minimum diameter of the reflecting drum, and hence the minimum diameter of the animated picture-bearing portion of the disk, should be about three inches (3") providing an annular band to contain the pictures about one and one-half inches (1½") wide. It was found that if the picture disk were reduced in diameter so as to provide an uncovered area to receive the sound grooves, the area available for the animated pictures would be so limited as to make it impossible to produce the pleasant effect obtained by the picture disk having a six inch (6") diameter.

Hence, according to the present invention, to avoid the reduction of the available space to receive the animated pictures and yet provide an uncovered area beyond the picture disk to receive the sound grooves, the diameter of the record disk is increased by an amount necessary to provide a sound groove band 14 of sufficient capacity to receive the sound desired to be reproduced in conjunction with the exhibition of the pictures. Preferably, the record disk measures about eight and one-half inches (8½") in diameter so as to provide a sound groove band having a width of about one inch (1") with one-eighth inch (⅛") spacing on each side.

By having the sound groove convolutions located at the outside of the record on radii varying from about three to four inches, it has been found that the sound grooves may be located very close together, thus providing ample space for recording the sound in a juvenile record of this kind. It has been found that the longer grooves of the record of the present invention make for greater ease of recording and for improved fidelity of reproduction.

Variations and modifications may be made within the scope of the claims and portions of the improvements may be used without others.

I claim:

1. A phonograph record disk for use with a reflecting mirror having a plurality of upwardly extending reflecting panels to be superposed on the center of the disk concentrically therewith for praxinoscopic picture viewing while the record is reproducing sound, said record comprising a flat solid plastic disk; and a flat picture disk permanently attached to and carried concentrically on the top face of said plastic disk and having thereon a circular series of related pictures in progressively changing attitudes of movement, the pictures being in left-right reversal and in addition having their bottoms directed toward the center of the disk, whereby the picture may be viewed along a horizontal plane in the reflecting mirror topside up and in natural form, said picture disk having a central circular area to receive and support a reflecting mirror, said picture disk having a diameter sufficient to provide an annular area spaced from the center of the disk extensive enough to receive pictures on a large enough scale to be viewable without substantial magnification, said plastic disk having a diameter greater than the diameter of the picture disk to provide an uncovered marginal annular band located between its peripheral edge and the periphery of said picture disk, said marginal band having the sound grooves of the record impressed therein, said sound grooves being on the same face of the record disk as the picture disk related thereto, the number of successive pictures in said circular series having a predetermined relation to the number of reflecting panels on said reflecting mirror.

2. A phonograph record disk as defined in claim 1, in which there is a plurality of radially spaced circular rows of angularly spaced related pictures, the pictures in the several rows being related to each other and positioned to be simultaneously viewed in the same reflecting panels.

References Cited in the file of this patent

UNITED STATES PATENTS

| | | |
|---|---|---|
| 887,716 | Xander | May 12, 1908 |
| 1,409,107 | Higginson | Mar. 7, 1922 |
| 1,658,030 | Adams | Feb. 7, 1928 |
| 1,913,913 | Boularan | June 13, 1933 |
| 1,929,173 | Koch | Oct. 3, 1933 |
| 1,933,305 | Belt | Oct. 31, 1933 |
| 1,937,378 | Alexanderson | Nov. 28, 1933 |
| 2,505,787 | Munkaesi et al. | May 2, 1950 |
| 2,561,971 | Bustanoby | July 24, 1951 |
| 2,587,433 | Bentley et al. | Feb. 26, 1952 |
| 2,647,437 | Bentley et al. | Aug. 4, 1953 |

FOREIGN PATENTS

| | | |
|---|---|---|
| 16,867 | Australia | Nov. 16, 1928 |
| 120,484 | France | Aug. 30, 1877 |

OTHER REFERENCES

"Hopwood's Living Pictures;" The Hatton Press, Foster, London, 1915, page 33 relied on.